US009855896B2

(12) United States Patent
Cha et al.

(10) Patent No.: US 9,855,896 B2
(45) Date of Patent: Jan. 2, 2018

(54) BICYCLE CARRIER APPARATUS FOR VEHICLE

(71) Applicant: Hyundai Motor Company, Seoul (KR)

(72) Inventors: Dong Eun Cha, Suwon-si (KR); Jin Young Yoon, Gimpo-si (KR); Seung Mok Lee, Osan-si (KR); Hyun Gyung Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 116 days.

(21) Appl. No.: 14/948,276

(22) Filed: Nov. 21, 2015

(65) Prior Publication Data
US 2017/0072866 A1    Mar. 16, 2017

(30) Foreign Application Priority Data
Sep. 11, 2015  (KR) ......................... 10-2015-0129039

(51) Int. Cl.
*B60R 3/00*   (2006.01)
*B60R 9/06*   (2006.01)
*B60R 9/10*   (2006.01)
*B60R 19/48*  (2006.01)

(52) U.S. Cl.
CPC ............. *B60R 9/06* (2013.01); *B60R 9/10* (2013.01); *B60R 19/48* (2013.01)

(58) Field of Classification Search
CPC .................................... B60R 9/10; B62H 3/00
USPC ................................................ 224/281, 924
See application file for complete search history.

(56) References Cited

U.S. PATENT DOCUMENTS

| | | | | |
|---|---|---|---|---|
| 1,585,871 A * | 5/1926 | Pels | ......................... | B60R 9/06 224/491 |
| 2,052,483 A * | 8/1936 | Monteith | .............. | B60R 19/023 224/491 |
| 3,251,520 A * | 5/1966 | Van Dyke | ................. | B60R 9/06 224/510 |
| 5,445,300 A * | 8/1995 | Eipper | ..................... | B60R 9/06 224/496 |
| 5,460,304 A * | 10/1995 | Porter | ...................... | B60R 9/06 224/485 |
| 5,615,813 A * | 4/1997 | Ouellette | .................. | B60P 3/40 224/405 |
| 7,044,347 B1 * | 5/2006 | Pedrini | .................... | B60R 9/10 224/324 |

(Continued)

FOREIGN PATENT DOCUMENTS

EP    2 017 131 A2    1/2009
EP    2 345 558 B1    4/2013

(Continued)

*Primary Examiner* — Brian D Nash
(74) *Attorney, Agent, or Firm* — Morgan, Lewis & Bockius LLP

(57) ABSTRACT

A bicycle carrier apparatus for a vehicle may include a slide carrier configured to slide in a front-rear direction of a rear bumper beam to be drawn out and stowed, extension supports laterally extending on the slide carrier to load a bicycle, a retainer rotatably disposed on the slide carrier and configured to be coupled to a bicycle loaded on the extension supports by a clamping device to retain the bicycle, and locking devices fixed to the slide carrier, holding the retainer to be rotatable, and fixing a rotational position of the retainer when a push lever is operated.

10 Claims, 7 Drawing Sheets

(56) References Cited

U.S. PATENT DOCUMENTS

| | | | | |
|---|---|---|---|---|
| 7,909,213 B2* | 3/2011 | Bergerhoff | ................. | B60R 9/10 |
| | | | | 224/197 |
| 8,418,902 B2* | 4/2013 | Cha | ........................... | B60R 9/06 |
| | | | | 224/488 |
| 9,039,263 B2* | 5/2015 | Hofmann | .................. | B60R 9/10 |
| | | | | 362/549 |
| 9,174,584 B1* | 11/2015 | Cha | ........................... | B60R 9/10 |
| 9,346,412 B2* | 5/2016 | Cha | ........................... | B60R 9/06 |
| 9,352,699 B2* | 5/2016 | Cha | ........................... | B60R 9/06 |
| 9,555,744 B1* | 1/2017 | Roth | ......................... | B60R 9/10 |
| 2005/0061842 A1* | 3/2005 | Tsai | ........................... | B60R 9/06 |
| | | | | 224/501 |
| 2007/0090142 A1* | 4/2007 | Chuang | ..................... | B60P 3/07 |
| | | | | 224/496 |
| 2008/0142559 A1 | 6/2008 | Lim | | |
| 2010/0001029 A1* | 1/2010 | Tai | ........................... | B60R 9/06 |
| | | | | 224/499 |
| 2010/0089957 A1* | 4/2010 | Barth | ........................ | B60R 9/10 |
| | | | | 224/497 |
| 2011/0108592 A1* | 5/2011 | Lee | ........................... | B60R 9/06 |
| | | | | 224/488 |
| 2013/0182454 A1 | 7/2013 | Hofmann et al. | | |
| 2016/0052459 A1* | 2/2016 | Cha | ........................... | B60R 9/06 |
| | | | | 224/489 |

FOREIGN PATENT DOCUMENTS

| KR | 10-2011-0035378 A | 4/2011 |
|---|---|---|
| KR | 10-2012-0040928 A | 4/2012 |

* cited by examiner

BICYCLE CARRIER APPARATUS FOR VEHICLE

CROSS REFERENCE TO RELATED APPLICATION

The present application claims priority to Korean Patent Application No. 10-2015-0129039, filed Sep. 11, 2015, the entire contents of which is incorporated herein for all purposes by this reference.

BACKGROUND OF THE INVENTION

Field of the Invention

The present invention relates to a bicycle carrier apparatus for a vehicle that is mounted on the rear bumper of a vehicle to load a bicycle.

Description of Related Art

Recently, as people use bicycles for leisure activities, they load bicycles on vehicles to carry them around bicycle-only roads or mountains.

However, bicycles are generally large in volume, so they are difficult to load even using the trunk or the backseat space of vehicles.

Although various methods of loading a bicycle on the outer surfaces of vehicles have been proposed to solve the problem, the manner of loading and fixing a bicycle on the roof panel of a vehicle not only makes loading itself very inconvenient, but increases the height of the vehicle, such that it may cause a safety accident due to the bicycle caught to a tunnel or a building, when the vehicle enters the structures.

In the case of a bicycle mounted on the tailgate of a vehicle, complex installation is required for a specific carrier device; and the carrier device remains visible even when there is no bicycle mounted thereon, thereby detracting from the external appearance of a vehicle.

Further, it is troublesome to install the carrier device in order to load a bicycle and to remove the carrier device, when there is no need for usage, thus decreasing convenience.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a carrier apparatus for a vehicle which is disposed inside a rear bumper beam of a vehicle, is not exposed to the outside when not in use, and can keep the external appearance of the vehicle and improve convenience by automatically drawing out of a rear bumper beam so that a bicycle can be loaded, when the bicycle loading is desired.

According to various aspects of the present invention, a bicycle carrier apparatus for a vehicle may include a slide carrier configured to slide in a front-rear direction of a rear bumper beam to be drawn out and stowed, extension supports laterally extending on the slide carrier to load a bicycle, a retainer rotatably disposed on the slide carrier and configured to be coupled to a bicycle loaded on the extension supports by a clamping device to retain the bicycle, and locking devices fixed to the slide carrier, holding the retainer to be rotatable, and fixing a rotational position of the retainer when a push lever is operated.

Guide rails extending in the front-rear direction are disposed on the rear bumper beam and the slide carrier may include a panel and side rails to slide on the guide rails and may be configured to be drawn in and out along the guide rails.

Extension rails may be fixed on the slide carrier between the side rails, and the extension supports may be slidably disposed on the extension rails to slide laterally along the extension rails.

On the extension supports, straps for winding around wheels of a loaded bicycle are disposed and strap grooves for holding the straps are formed.

The retainer may include side frames rotatably connected to the slide carrier through the locking devices and a bridge frame connecting the side frames to each other.

The retainer may further include a support frame extending straight between the side frames and bent at a center such that both ends thereof have different heights.

The locking device may include a case fixed to the slide carrier and having a slot formed in a rotational direction of the retainer, a rotary member rotatably fitted on a hinge pin fixed inside the case, coupled to the retainer, and having a locking groove, and a locking member coupled to the push lever exposed outside the case and selectively inserted into the locking groove of the rotary member when the push lever is operated.

A plurality of grooves may be formed with regular intervals on an outer side of the hinge pin and a plurality of projections corresponding to the grooves may be formed on an inner side of the rotary member.

A support bracket having a first spring is disposed inside the case and the locking member may have a first end inserted and locked in the locking groove and a second end protruding through the support bracket, and the first end of the locking member may be elastically supported by the first spring.

The push lever may have a first end positioned at an opposite side to the locking member with the rotary member therebetween, a middle portion coupled to a side of the case, and a second end bent along an outer side of the support bracket and connected to the second end of the locking member.

A housing covering the middle portion of the push lever may be coupled to the side of the case, a contact protrusion may be formed outward on the middle portion of the push lever, and a second spring may be disposed inside the housing and elastically support the contact protrusion.

The second end of the push lever may be formed in a shape of a rectangle covering the second end of the locking member and may be fastened by a fixing pin that is inserted with the second end of the push lever covering the second end of the locking member.

According to the bicycle carrier apparatus for a vehicle that has the structure described above, the bicycle carrier is disposed inside the bumper back beam at the rear of a vehicle, so it is not exposed to the outside in normal times, but automatically slides out from the bumper back beam to load a bicycle, and therefore, the external appearance of a vehicle is maintained and convenience is also improved.

Further, it is more convenient to use the retainer for retaining a loaded bicycle with a clamping device, so the commercial value is improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
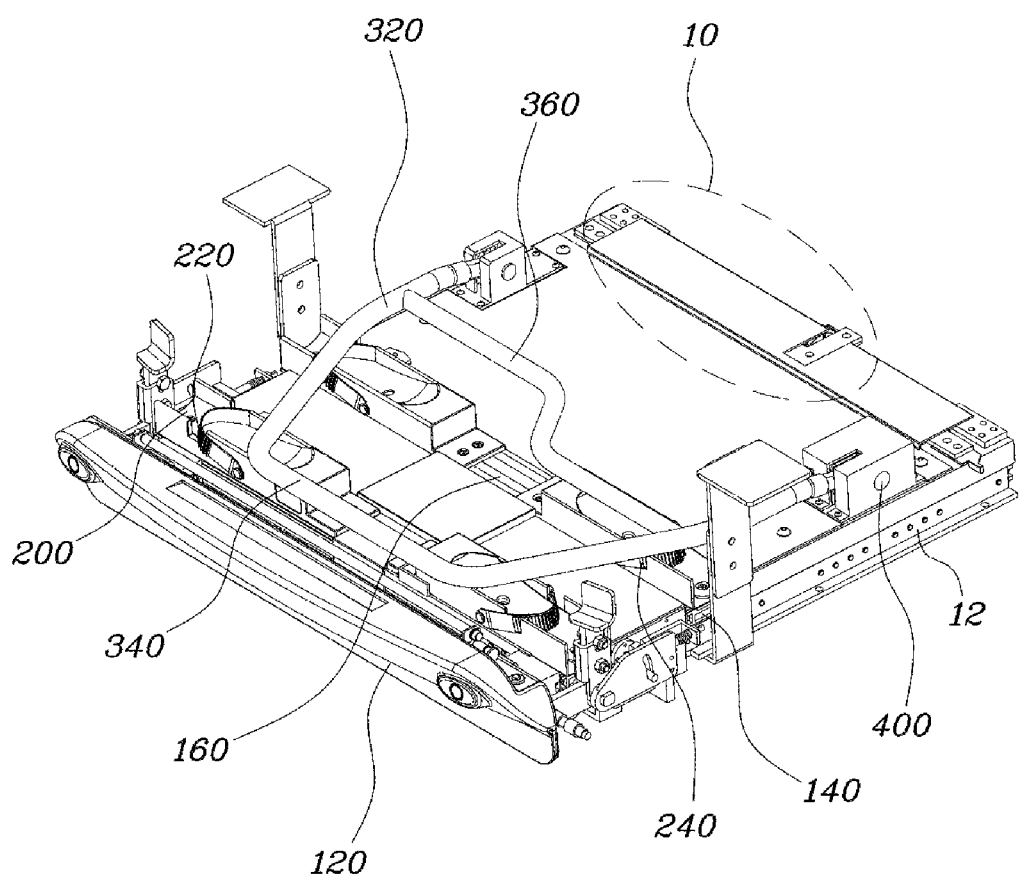
FIG. 1, FIG. 2, and FIG. 3 are views showing an exemplary bicycle carrier apparatus for a vehicle according to the present invention.
Figure 2:
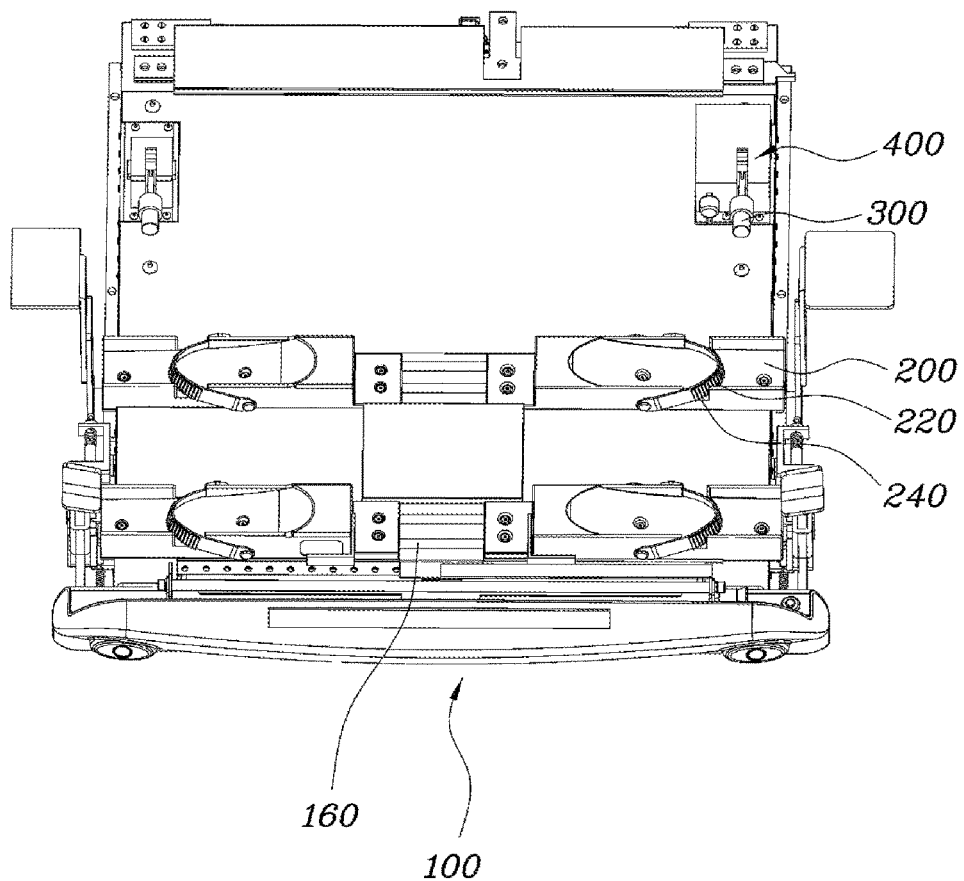
Figure 3:
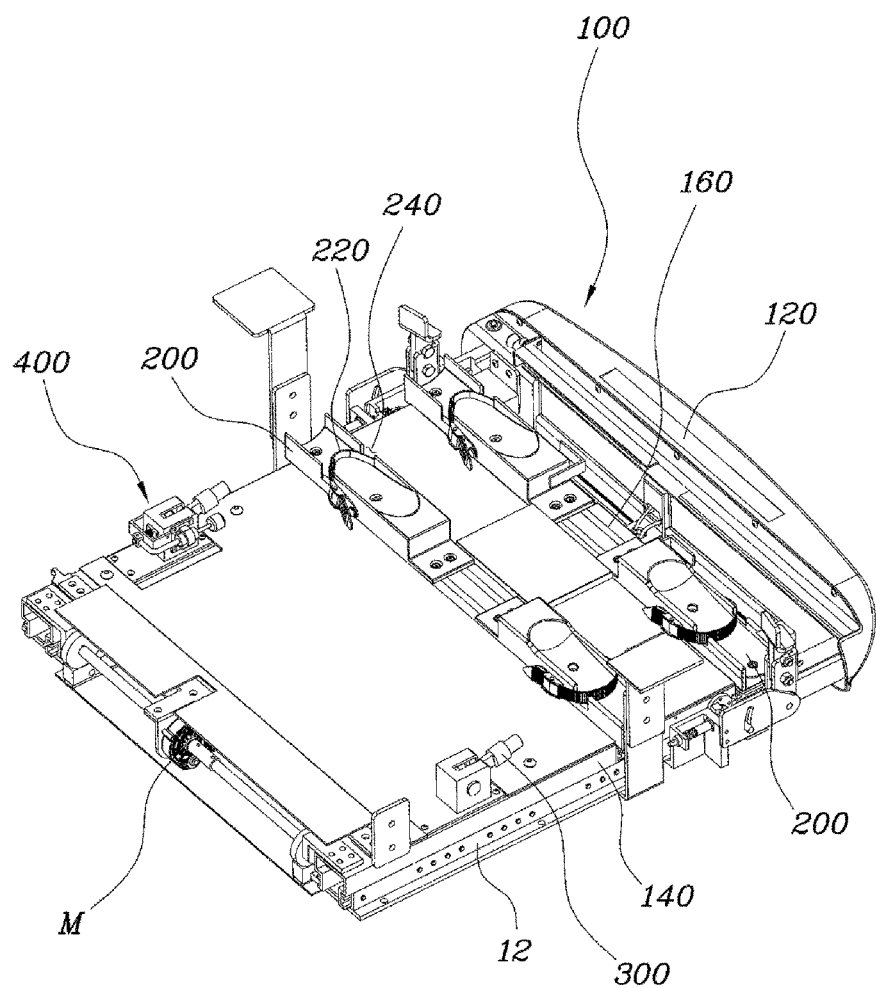
Figure 4:
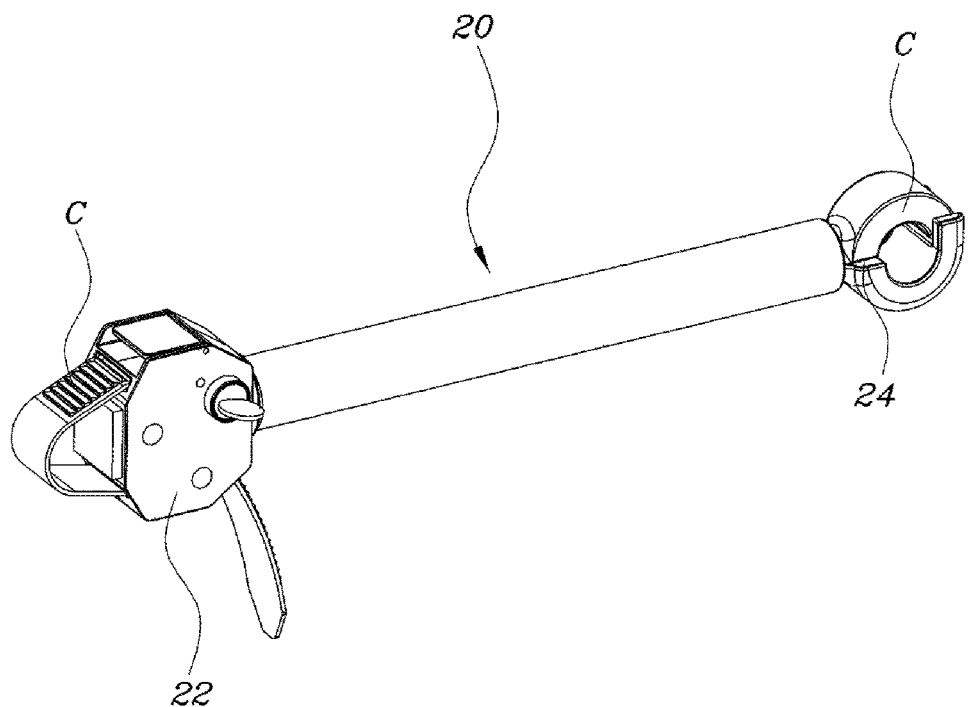
FIG. 4 is a view showing a clamping device for the exemplary bicycle carrier apparatus for a vehicle shown in FIG. 1.

FIGS. 1 to 3 are views showing a bicycle carrier apparatus for a vehicle according to various embodiments of the present invention, FIG. 4 is a view showing a clamping device for a bicycle carrier apparatus for a vehicle shown in FIG. 1, and FIGS. 5 to 7 are views illustrating the bicycle carrier apparatus for a vehicle shown in FIG. 1.

A bicycle carrier apparatus according to various embodiments of the present invention, as shown in FIGS. 1 to 3, includes a slide carrier 100 sliding in a front-rear direction of a rear bumper beam 10 to be drawn out and stowed, extension supports 200 laterally stretching out on the slide carrier 100 to load a bicycle, a retainer 300 rotatably disposed on the slide carrier 100 and coupled to a bicycle loaded on the extension supports 200 by a clamping device 20 to retain the bicycle, and locking devices 400 fixed to the slide carrier 100, holding the retainer 300 to be rotatable, and fixing a rotational position of the retainer 300 when a push lever 482 is operated.

As described above, the bicycle carrier apparatus for a vehicle of the present invention includes the slide carrier 100 that slides on the rear bumper beam 100 and the extension supports 200 that stretch out from the slide carrier 100 and laterally move to fit the size of a bicycle. Accordingly, the slide carrier 100 is stowed inside the rear bumper beam 10 of a vehicle not to be exposed when not in use, and is drawn out of the rear bumper beam 10 so that a bicycle can be loaded, when the bicycle loading is desired. The extension supports 200 may be a pair symmetrically arranged and they stretch out in opposite directions, so they can stretch away from each other to fit the size of a bicycle.

In particular, since the retainer 300 is rotatably disposed on the slide carrier 100, a bicycle loaded on the extension supports 200 is retained by the retainer 300 through the clamping device 20.

The retainer 300 is folded on the slide carrier 100, but in order to load a bicycle, it is turned upward and then fixed with the body of the bicycle on the extension supports 200, so the loaded bicycle can be more firmly fixed.

The retainer 300 is rotatably mounted by locking devices 400 on the slide carrier 100 and the locking devices 400 include a push lever 482, and allow the retainer 300 to rotate or fix the rotational position, depending on whether the push lever 482 is operated.

That is, the locking devices 400 keep the retainer 300 folded, and when a user operates the push lever 482, the retainer 300 is allowed to rotate, so the retainer 300 can be used in accordance with whether to use a bicycle only by operating the locking device 400.

In detail, as shown in FIGS. 1 to 3, guide rails 12 extending the front-rear direction are disposed on the rear bumper beam 10 and the slide carrier 100 has a panel 120 and side rails 140 sliding on the guide rails 12, so the slide carrier 100 can be drawn in and out along the guide rails 12.

That is, the slide carrier 100 is configured such that the side rails 140 can slide along the guide rails 12 fixed to the rear bumper beam 10. The slide carrier 100 is equipped with a separate motor M connected with the guide rails 12 and rollers (not shown) are rolled on the guide rails 12 so that when the motor M is operated, the slide carrier 100 can move along the guide rails 12. To this end, the motor M has a pinion structure and the guide rails 12 have a rack structure, so the motor M and the guide rails 12 can be connected in the rack and pinion structure, and the motor M can be controlled by a user through a remote controller.

Extension rails 160 are fixed on the slide carrier 100 between the side rails 140 and the extension supports 200 are slidably disposed on the extension rails 160, so the extension supports 200 can slide laterally along the extension rails 160.

That is, the extension rails 160 are arranged laterally on the slide carrier 100 and the extension supports 200 are coupled to the extension rails 160, so the extension supports 200 slide along the extension rails 160. The extension supports 200 are provided in a pair to laterally stretch out, so they can be set to fit the width of a bicycle.

In particular, as shown in FIGS. 2 and 3, on the extension supports 200, straps 220 for winding around the wheels of a loaded bicycle may be disposed and strap grooves 240 for holding the straps 220 may be formed.

As described above, the straps 220 winding around the wheels of a loaded bicycle are disposed on the extension supports 220 and the strap grooves 240 are formed at both sides of the extension supports 200 to hold the straps 220, so the straps 220 are not exposed to the outside, but received inside the strap grooves 240 when a bicycle is not loaded, thereby maintaining simple external appearance.

The retainer 300 may include side frames 320 rotatably connected to the slide carrier 100 through the locking devices 400 and a bridge frame 340 connecting the side frames 320.

The retainer 300 may further have a support frame 360 extending straight between the side frames 320 and bending at the center such that both ends have different heights.

The clamping device 20 has a first end 22 to be coupled to the body of a bicycle and a second end 24 fixed to the retainer 300.

A bicycle is retained by the retainer 300 through the clamping device 20. The clamping device 20, as shown in FIG. 4, has a fastening mechanism at the first end 22 and the second end 24, and the first end 22 is fastened to the body of a bicycle and the second end 24 is fastened to the retainer 300 to firmly fix a loaded bicycle. The clamping device 20, a part for fixing a bicycle, is well known in the art, so it is not described in detail here.

The retainer 300 has the bridge frame 340 and the support frame 360 at the upper and lower portions of the side frames 320, so when a bicycle is not loaded, the clamping device can be stably stowed with the first end fixed to the support frame 360 and the second end fixed to the bridge frame 340.

Further, since the support frame 360 is bent at the center such that both ends have different heights, it can stably retain a bicycle after adjusting the clamping device to fit the size of the bicycle.

Figure 5:
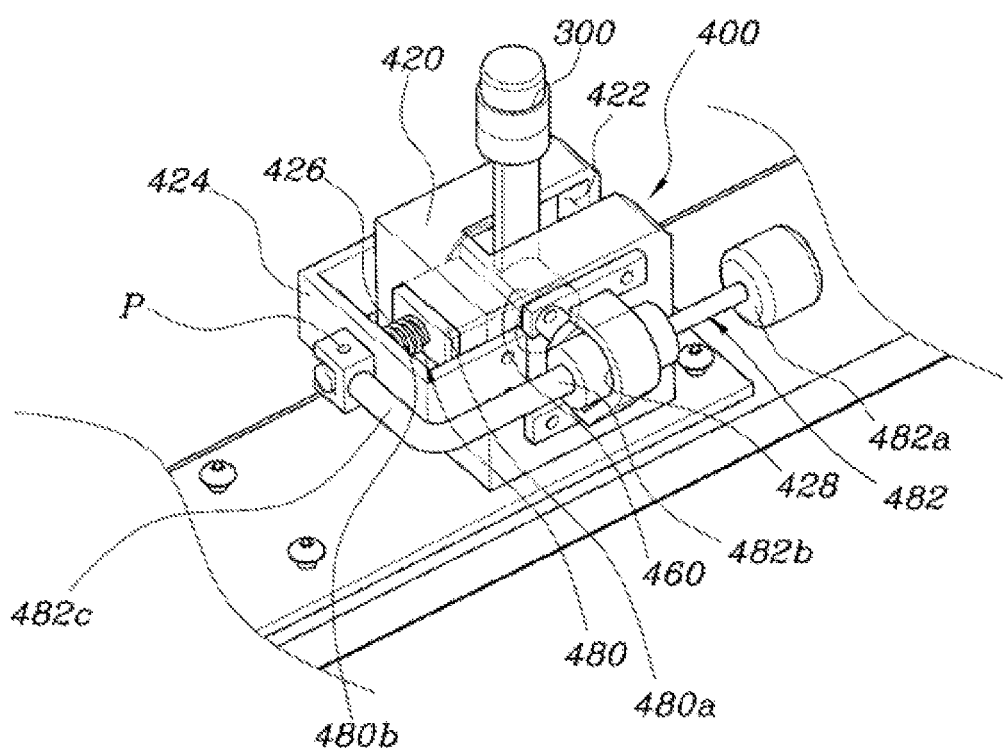
FIG. 5, FIG. 6, and FIG. 7 are views illustrating the exemplary bicycle carrier apparatus for a vehicle shown in FIG. 1.
Figure 6:
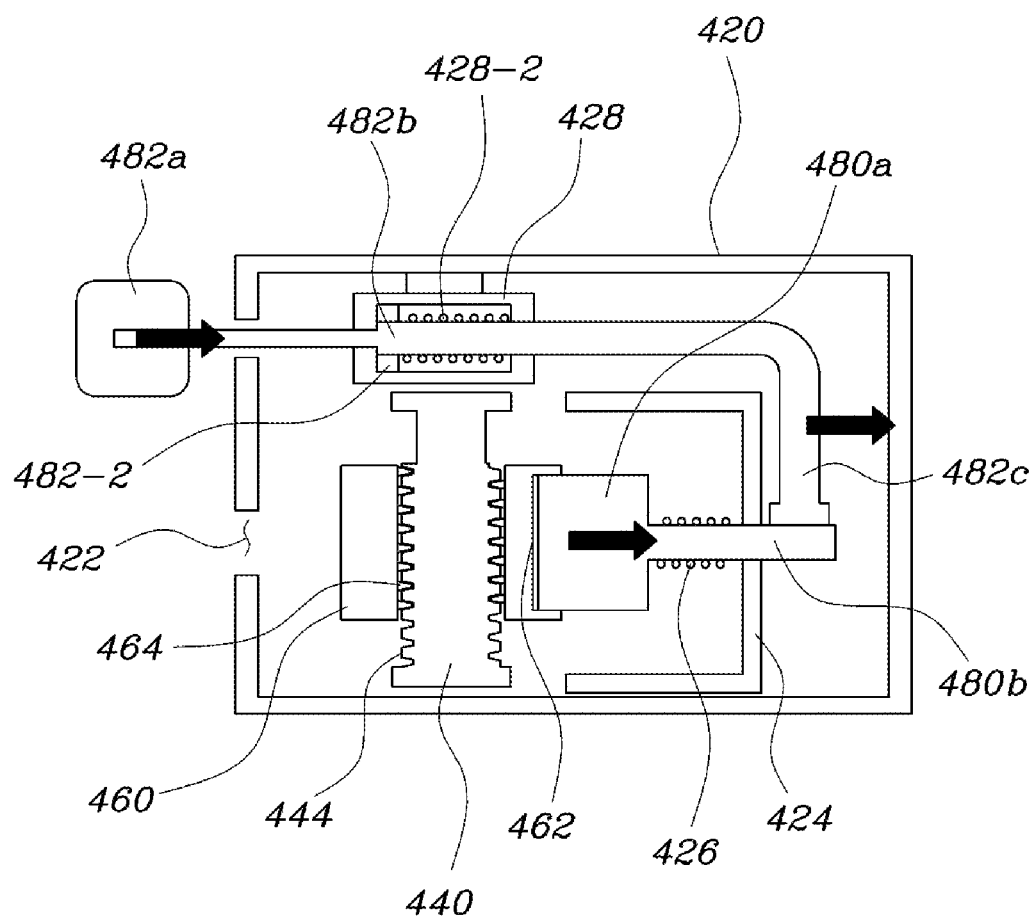
Figure 7:
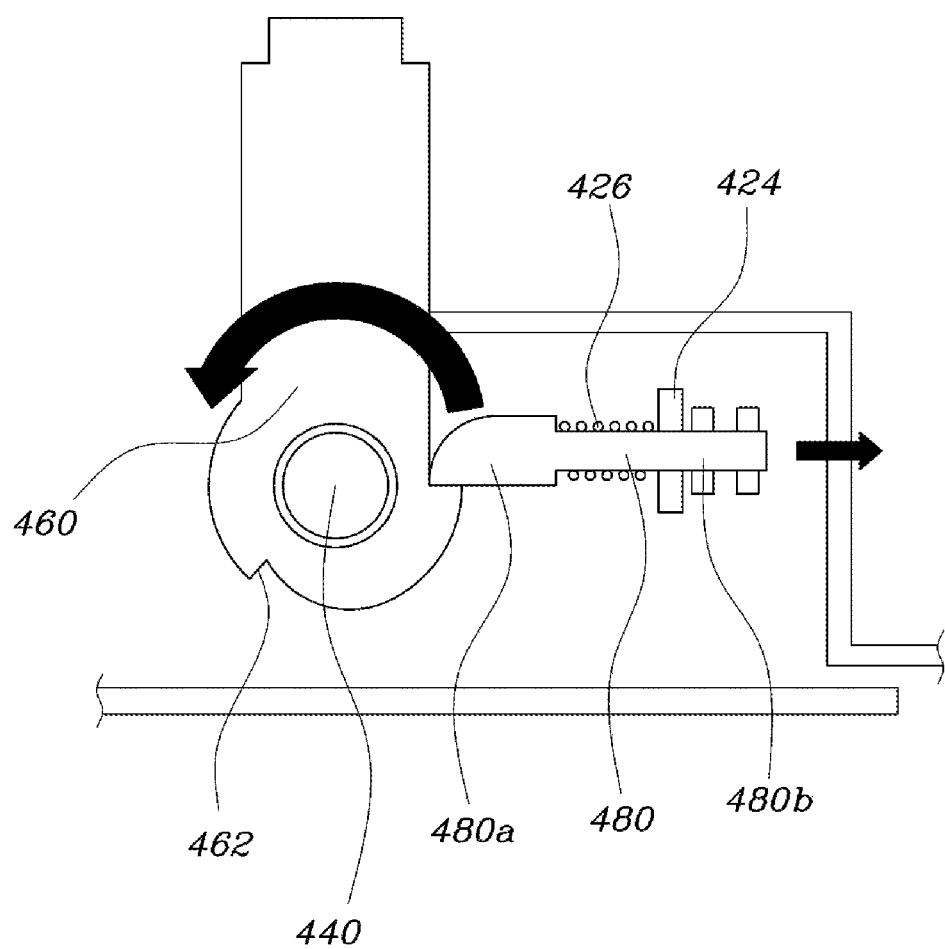

As shown in FIGS. 5 to 7, the locking device 400 may include a case 420 fixed to the slide carrier 100 and having a slot 422 formed in the rotational direction of the retainer 300; a rotary member 460 rotatably fitted on a hinge pin 440 fixed inside the case 420, coupled to the retainer 300, and having a locking groove 462; and a locking member 480 coupled to a push lever 482 exposed outside the case 420 and selectively inserted into the locking groove 462 of the rotary member 460 when the push lever 482 is operated.

The slot 422 of the case 420 may be formed in the folding direction of the retainer 300, not across the hinge pin 440 in the case 420, so it prevents the retainer 300 from rotating over the vertical position.

The rotary member 460 is rotatably fitted on the hinge pin 440 in the case 420. In particular, since the rotary member 460 has the locking groove 462 and the locking member 480 is inserted in the locking groove 462, rotation of the rotary member 460 is allowed or prevented so that the retainer 300 can be folded or rotated.

In detail, a plurality of grooves 444 may be formed with regular intervals on the outer side of the hinge pin 440 and a plurality of projections 464 corresponding to the grooves 444 may be formed on the inner side of the rotary member 460.

The projections 464 of the rotary member 460 are inserted in the grooves 444 of the hinge pin 440, so the rotary member 460 cannot laterally move and rotates only in the direction of the grooves 444. Accordingly, the retainer 300 is rotated only in the front-rear direction of the slide carrier and noise due to shaking when the retainer is rotated can be prevented.

On the other hand, a support bracket 424 having a first spring 426 is disposed inside the case 420 and the locking member 480 has a first end 480a inserted and locked in the locking groove 462 and a second end 480b protruding through the support bracket 424, in which the first end 480a may be elastically supported by the first spring 426.

That is, in the case 420, the first end 480a of the locking member is movable into the locking groove 462 and the second end 480b of the locking member 480 is disposed through the support bracket 422, so the locking member 480 can move straight toward the rotary member 460. In particular, the support bracket 424 has the first spring and the first spring elastically supports the first end 480a of the locking member 480, so the locking member 480 is moved to the rotary member 460 by elastic force. Accordingly, when the push lever to be described below is not operated, the locking member 480 is in contact with the rotary member 460, that is, the locking member 480 is maintained in the locking groove 462 of the rotary member 460, so the retainer 300 cannot be moved unless the push lever 484 is operated.

The push lever 482 has a first end 482a positioned at the opposite side to the locking member 480 with the rotary member 460 therebetween, a middle portion 482b coupled to a side of the case 420, and a second end 482c bent along the outer side of the support bracket 424 and connected to the second end 480b of the locking member 480. Accordingly, when the push lever 482 is pushed to move straight, the locking member 480 moves straight in the pushing direction, so it can come out of the locking groove 462 of the rotary member 460.

A housing 428 covering the middle portion 482b of the push lever 482 is coupled to the side of the case 420, a contact protrusion 482-2 is formed outward on the middle portion 482b of the push lever 482, and a second spring 428-2 is disposed inside the housing 428 and can elastically support the contact protrusion 428-2.

As described above, since the contact protrusion 482-2 on the middle portion 482b of the push lever 482 is elastically supported by the second spring 428-2 inside the housing 428 coupled to the side of the case 420, the push lever 482 is returned by the second spring 428-2 after being operated, so it is possible to prepare for the next operation and smoothly perform the next operation.

The second end 482c of the push lever 482 is formed in the shape of a rectangle covering the second end 480b of the locking member 480 and can be fastened by a fixing pin P that is inserted with the second end 482c of the push lever 482 covering the second end 480b of the locking member 480.

Accordingly, when the push lever 482 is pushed and the second end 480b of the locking member 480 is moved, the second end of the push lever 482 is moved backward without rotating about the second end 480b of the locking member 480 because the rectangular second end 482c of the push lever 482 covers the second end 480b of the locking member 480. Further, since the second end 482c of the push lever 482 is connected to the second end 480b of the locking member 480 and then fastened by the fixing pin P, the push lever 482 and the locking member 480 are moved together.

As described above, the slide carrier 100 slides forward/backward on the rear bumper beam 10 to be drawn out and stowed and the extension supports 200 are mounted on the slide carrier 100 to laterally stretch out to load a bicycle.

In particular, the retainer 300 for retaining a bicycle loaded on the extension supports 200 is turned by operating the push lever 482 of the locking devices 400. That is, as shown in FIG. 6, when the push lever 482 of the locking device 400 is pushed and moved straight, the second end 480b of the locking member 480 moves straight together with the push lever 482 and the first end 480a of the locking member 480 comes out of the locking groove 462 of the rotary member 460.

Accordingly, the rotary member 460 is allowed to rotate and turns up the folded retainer 300 vertically by rotating on the hinge pin so that a bicycle can be fixed through the clamping device. When the retainer 300 is turned up, the first end 480*a* of the locking member 480 is returned by the first spring and the second spring 428-2 elastically supporting the push lever 482, so the locking member 480 is locked in the locking groove 462 of the rotary member 460 and prevents rotation of the rotary member 460.

Accordingly, the retainer 300 is maintained at the turned-up position and the position of a bicycle coupled to the retainer 300 can be firmly fixed by the clamping device.

According to the bicycle carrier apparatus for a vehicle which has the structure described above, the carrier is stowed in the rear bumper beam 10 at the rear of a vehicle, so it is not exposed to the outside when not in use, but is automatically drawn out from the rear bumper beam 10 to load a bicycle, and therefore, the external appearance of a vehicle is maintained and convenience is also improved.

Further, it is more convenient to use the retainer 300 for retaining a loaded bicycle with a clamping device, so the commercial value is improved.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bicycle carrier apparatus for a vehicle, comprising:
 a slide carrier configured to slide in a front-rear direction of a rear bumper beam to be drawn out and stowed;
 extension supports laterally extending on the slide carrier to load a bicycle;
 a retainer rotatably disposed on the slide carrier and configured to be coupled to a bicycle loaded on the extension supports by a clamping device to retain the bicycle; and
 locking devices fixed to the slide carrier, holding the retainer to be rotatable, and fixing a rotational position of the retainer when a push lever is operated,
 wherein guide rails extending in the front-rear direction are disposed on the rear bumper beam,
 wherein the slide carrier includes:
  a panel mounted on the slide carrier; and
  side rails to slide on the guide rails,
 wherein the slide carrier is configured to be drawn in and out along the guide rails, and
 wherein extension rails are fixed on the slide carrier between the side rails, and the extension supports are slidably disposed on the extension rails to slide laterally along the extension rails.

2. The bicycle carrier apparatus of claim 1, wherein on the extension supports, straps for winding around wheels of the loaded bicycle are disposed and strap grooves for holding the straps are formed.

3. The bicycle carrier apparatus of claim 1, wherein the retainer includes side frames rotatably connected to the slide carrier through the locking devices and a bridge frame connecting the side frames to each other.

4. The bicycle carrier apparatus of claim 3, wherein the retainer further includes a support frame extending straight between the side frames and bent at a center such that both ends thereof have different heights.

5. The bicycle carrier apparatus of claim 1, wherein the locking device includes:
 a case fixed to the slide carrier and having a slot formed in a rotational direction of the retainer;
 a rotary member rotatably fitted on a hinge pin fixed inside the case, coupled to the retainer, and having a locking groove; and
 a locking member coupled to the push lever exposed outside the case and selectively inserted into the locking groove of the rotary member when the push lever is operated.

6. The bicycle carrier apparatus of claim 5, wherein a plurality of grooves is formed with regular intervals on an outer side of the hinge pin and a plurality of projections corresponding to the grooves is formed on an inner side of the rotary member.

7. The bicycle carrier apparatus of claim 5, wherein a support bracket having a first spring is disposed inside the case and the locking member has a first end inserted and locked in the locking groove and a second end protruding through the support bracket, and
 wherein the first end of the locking member is elastically supported by the first spring.

8. The bicycle carrier apparatus of claim 7, wherein the push lever has a first end positioned at an opposite side to the locking member with the rotary member therebetween, a middle portion coupled to a side of the case, and a second end bent along an outer side of the support bracket and connected to the second end of the locking member.

9. The bicycle carrier apparatus of claim 8, wherein a housing covering the middle portion of the push lever is coupled to the side of the case, a contact protrusion is formed outward on the middle portion of the push lever, and a second spring is disposed inside the housing and elastically supports the contact protrusion.

10. The bicycle carrier apparatus of claim 8, wherein the second end of the push lever is formed in a shape of a rectangle covering the second end of the locking member and is fastened by a fixing pin that is inserted with the second end of the push lever covering the second end of the locking member.

* * * * *